US009586128B2

(12) United States Patent
Condoianis et al.

(10) Patent No.: US 9,586,128 B2

(45) Date of Patent: Mar. 7, 2017

(54) COLLAPSIBLE SKI CADDY

(71) Applicant: Skis Caddy LLC, Littleton, CO (US)

(72) Inventors: Jon Condoianis, Littleton, CO (US); Semiramida F. Condoianis, Littleton, CO (US)

(73) Assignee: Skis Caddy LLC, Littleton, CO (US)

( * ) Notice: Subject to any disclaimer, the term of this patent is extended or adjusted under 35 U.S.C. 154(b) by 7 days.

(21) Appl. No.: 14/704,342

(22) Filed: May 5, 2015

(65) Prior Publication Data

US 2015/0321073 A1 Nov. 12, 2015

Related U.S. Application Data

(60) Provisional application No. 61/989,166, filed on May 6, 2014.

(51) Int. Cl.

| | |
|---|---|
| ***B62B 1/14*** | (2006.01) |
| ***A63C 11/02*** | (2006.01) |
| ***B62B 1/12*** | (2006.01) |
| *B62B 5/06* | (2006.01) |

(52) U.S. Cl.

CPC ............ *A63C 11/026* (2013.01); *B62B 1/125* (2013.01); *B62B 5/067* (2013.01); *B62B 2202/401* (2013.01); *B62B 2205/33* (2013.01)

(58) Field of Classification Search

None

See application file for complete search history.

(56) References Cited

U.S. PATENT DOCUMENTS

| | | | | |
|---|---|---|---|---|
| 4,033,460 A * | 7/1977 | Alexandre | A63C 11/028 | 211/35 |
| 4,114,915 A * | 9/1978 | Lello | A63C 11/00 | 280/47.19 |
| 4,268,050 A * | 5/1981 | Kennedy, Sr. | B60R 9/12 | 224/324 |
| 4,666,184 A | 5/1987 | Garvey, Jr. | | |
| 4,896,897 A * | 1/1990 | Wilhelm | B62B 1/002 | 280/47.2 |
| 5,106,112 A * | 4/1992 | Sargent | A63C 11/026 | 224/917 |
| 5,340,153 A * | 8/1994 | Parker | A63C 11/026 | 280/47.17 |
| 6,070,906 A | 6/2000 | Allen | | |

(Continued)

*Primary Examiner* — John Walters

*Assistant Examiner* — Hilary L Johns

(74) *Attorney, Agent, or Firm* — Neustel Law Offices; Jason L. Gilbert

(57) ABSTRACT

A collapsible ski caddy which both transports skis and poles in a caddy configuration and is easily transportable itself in a collapsed configuration. The collapsible ski caddy generally includes a frame having a first telescopic member and a second telescopic member in parallel relationship. A base and one or more connectors link the telescopic members in a spaced-apart configuration. The base may itself be collapsible and includes a pair of wheels. The connectors include hinged locking members for removably securing skis against the frame. The connectors may also include pole retainers for removably securing poles against the frame. The present invention is easily interchangeable between a caddy configuration for transporting the skis and poles and a collapsed configuration for transporting the present invention itself.

18 Claims, 8 Drawing Sheets

(56) References Cited

U.S. PATENT DOCUMENTS

| | | | | |
|---|---|---|---|---|
| 6,158,762 | A * | 12/2000 | Wong | B62B 1/125 248/169 |
| 6,848,718 | B2 * | 2/2005 | Ravikumar | A63C 11/023 280/35 |
| 7,490,858 | B1 * | 2/2009 | Sellers | A63C 11/026 280/47.26 |
| 7,798,528 | B2 * | 9/2010 | Sellers | A63C 11/026 280/47.26 |
| 2007/0222168 | A1 * | 9/2007 | Sellers | A63C 11/026 280/79.7 |
| 2012/0187644 | A1 | 7/2012 | Van Der Wal | |
| 2014/0210172 | A1 * | 7/2014 | Lurie | B62B 1/262 280/47.24 |

* cited by examiner

COLLAPSIBLE SKI CADDY

CROSS REFERENCE TO RELATED APPLICATIONS

I hereby claim benefit under Title 35, United States Code, Section 119(e) of U.S. provisional patent application Ser. No. 61/989,166 filed May 6, 2014. The 61/989,166 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a ski caddy and more specifically it relates to a collapsible ski caddy which both transports skis and poles in a caddy configuration and is easily transportable itself in a collapsed configuration.

Description of the Related Art

Any discussion of the related art throughout the specification should in no way be considered as an admission that such related art is widely known or forms part of common general knowledge in the field.

Since the advent of skiing, numerous designs have been proposed for carts, caddies, backpacks, and the like for transporting skis and poles. The nature of skis, such as their elongated configuration and use of multiple, discrete parts, makes them difficult to transport. Carrying skis in ones hands is burdensome in that the skis and poles can be difficult not only to hold but also to navigate through indoor areas with. While there are preexisting devices for transporting skis and the like, these devices are often difficult to transport themselves and, in many cases, very difficult to use.

Because of the inherent problems with the related art, there is a need for a new and improved collapsible ski caddy which both transports skis and poles in a caddy configuration and is easily transportable itself in a collapsed configuration.

BRIEF SUMMARY OF THE INVENTION

The invention generally relates to a ski caddy which includes a collapsible frame having a first telescopic member and a second telescopic member in parallel relationship. A foldable base and one or more connectors link the telescopic members in a spaced-apart configuration. The base may itself be foldable and includes a pair of wheels. The connectors include hinged locking members for removably securing skis against the frame. The connectors may also include pole retainers for removably securing poles against the frame. The present invention is easily interchangeable between a caddy configuration for transporting the skis and poles and a collapsed configuration for transporting the present invention itself that might include a removable backpack for easy transportation while not in use.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
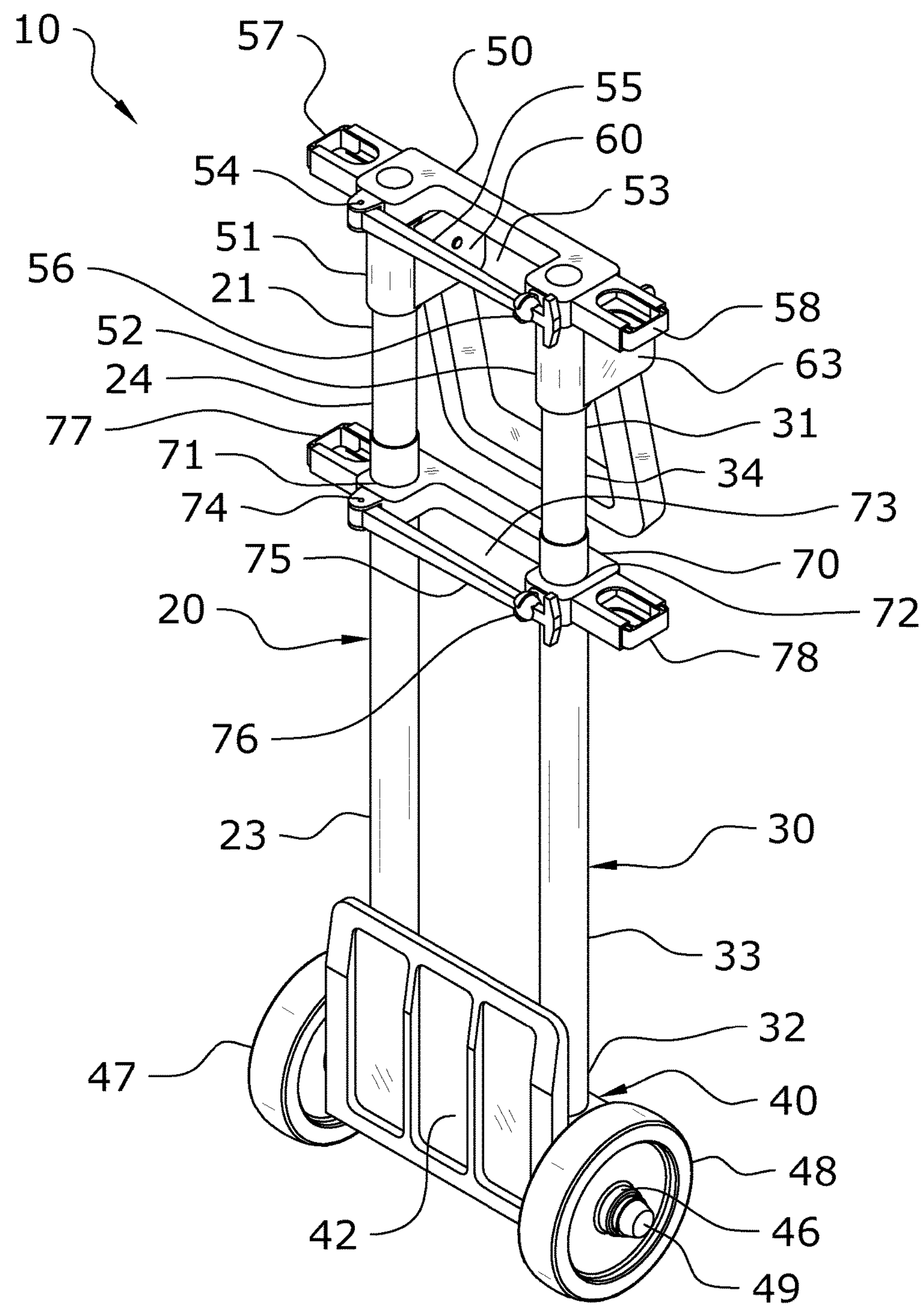
FIG. 1 is an upper perspective view of the present invention in a collapsed configuration.

Turning now descriptively to the drawings, in which similar reference characters denote similar elements throughout the several views, FIGS. 1 through 9 illustrate a collapsible ski caddy 10, which comprises a frame having a first telescopic member 20 and a second telescopic member 30 in parallel relationship. A base 40 and one or more connectors 50, 70 link the telescopic members 20, 30 in a spaced-apart configuration. The base 40 may itself be foldable and includes a pair of wheels 47, 48. The connectors 50, 70 include hinged locking members 55, 75 for removably securing skis 12 against the frame. The connectors 50, 70 may also include pole retainers 57, 58, 77, 78 for removably securing poles 13 against the frame. The present invention is easily interchangeable between a caddy configuration for transporting the skis 12 and poles 13 and a collapsed configuration for transporting the present invention itself.

B. Frame

As shown throughout the figures, the present invention includes a frame comprising a first telescopic member 20 and a second telescopic member 30 which are oriented in a parallel relationship. The length, size, shape, and configuration of the telescopic members 20, 30 may vary in different embodiments. In a preferred embodiment shown in the figures, the telescopic members 20, 30 each comprise elongated, telescopic rods having a circular cross-section. It should be appreciated that other types of cross-sections could be utilized.

Figure 2:
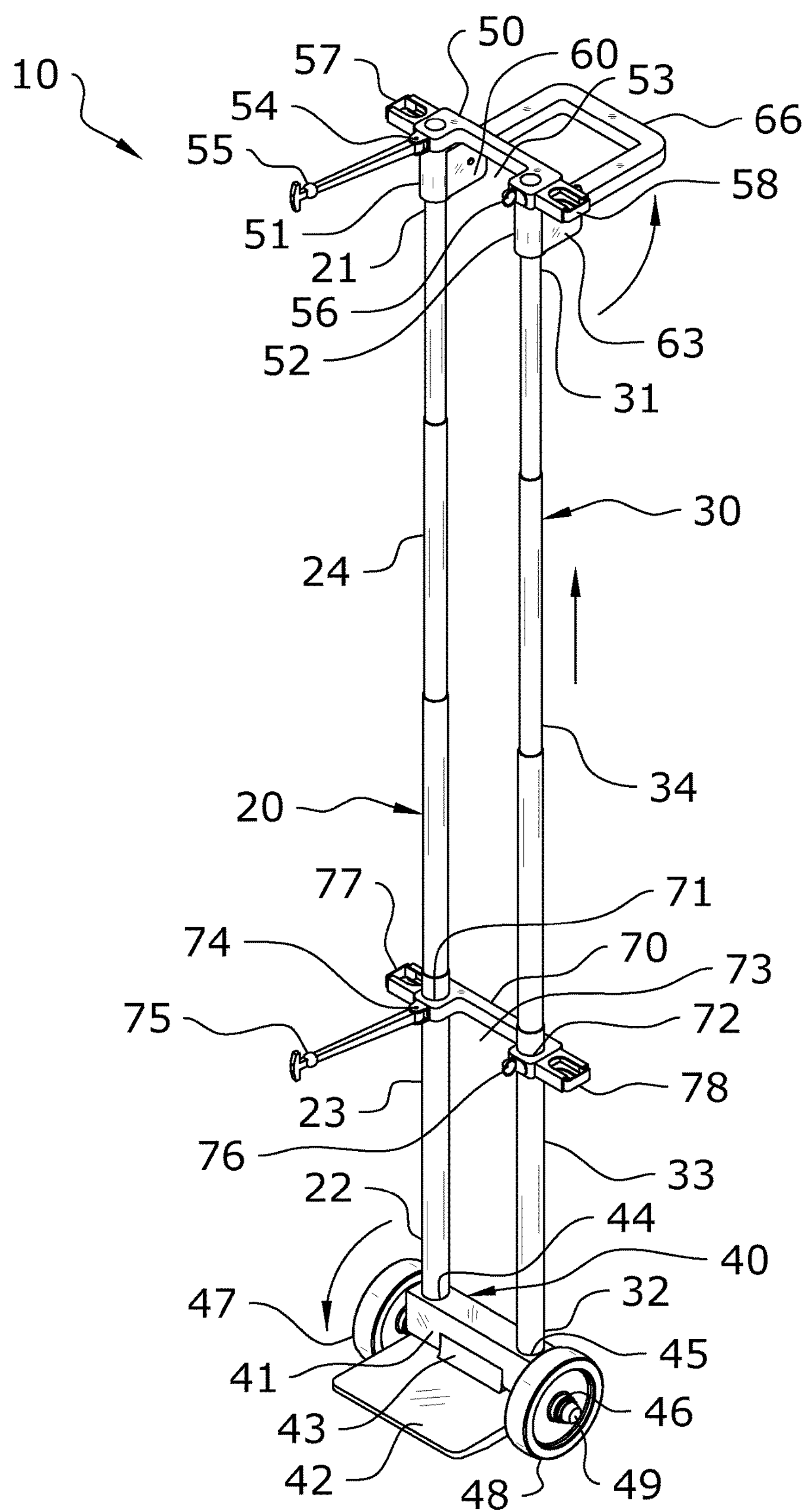
FIG. 2 is an upper perspective view of the present invention in a transport configuration.

As best shown in FIG. 2, the first telescopic member 20 includes an upper end 21 and a lower end 22. The upper end 21 of the first telescopic member 20 is connected to the upper connector 50 while the lower end 22 of the first telescopic member 20 is connected to the base 40. The first telescopic member 20 will generally include multiple sections to allow for telescopic extension or retraction of the member 20.

In the figures, the first telescopic member 20 includes a fixed portion 23 and a telescopic portion 24 which extends and retracts into and out of the fixed portion 23. The fixed portion 23 is shown as comprising the lower end 22 of the first telescopic member 20 in the figures, though it should be appreciated that the fixed portion 23 could, in some embodiments, comprise the upper end 23 or even a central portion of the first telescopic member 20. In any case, one or more telescopic portions 23 will extend from and retract into the fixed portion 23 to achieve the telescopic configuration for the first telescopic member 20.

As similarly shown in FIG. 2, the second telescopic member 30 includes an upper end 31 and a lower end 32. The upper end 31 of the second telescopic member 30 is connected to the upper connector 50 while the lower end 32 of the second telescopic member 30 is connected to the base 40. The second telescopic member 30 will generally include multiple portions to allow for telescopic extension or retraction of the second telescopic member 30.

In the figures, the second telescopic member 30 includes a fixed portion 33 and a telescopic portion 34 which extends and retracts into and out of the fixed portion 33. The fixed portion 33 is shown as comprising the lower end 32 of the second telescopic member 30 in the figures, though it should be appreciated that the fixed portion 33 could, in some embodiments, comprise the upper end 33 or even a central portion of the second telescopic member 30. In any case, one or more telescopic portions 34 will extend from and retract into the fixed portion 33 to achieve the telescopic configuration for the second telescopic member 30.

The telescopic members 20, 30 are adapted to retract into a collapsed configuration as shown in FIG. 1 for transporting the present invention, such as within a backpack, and a caddy configuration as shown in FIG. 2 for transporting skis 12 and the like. The effective length of the telescopic members 20, 30 will vary for different embodiments of the present invention; each such embodiment being adapted for different-sized skis 12. The width (i.e. the separation between the telescopic members 20, 30) of the frame may also vary in different embodiments to accommodate different ski 12 widths.

C. Base

As best shown in FIG. 2, the lower ends 22, 32 of the telescopic members 20, 30 are secured within a base 40. The base 40 both acts as a mounting point for both telescopic members 20, 30 and as a mounting point for wheels 47, 48 used to transport the present invention when being used to carry skis 12. The shape, size, and configuration of the base 40 may vary in different embodiments and should not be construed as limited by the exemplary figures.

As shown throughout the figures, the base 40 is preferably foldable to aid in easy storage of the present invention in its collapsed configuration. The base 40 will thus generally include a vertical portion 41 and a horizontal portion 42 which is hingedly connected to the vertical portion 41 such that the horizontal portion 42 may both rotate upwardly against the vertical portion 41 such as shown in FIG. 1 and rotate downwardly into a horizontal configuration such as shown in FIG. 2. Thus, a hinge 43 will generally be utilized to connect the vertical and horizontal portions 41, 42 of the base 40 to each other.

The telescopic members 20, 30 of the present invention are generally connected at their lower ends 22, 32 to the vertical portion 41 of the base 40. In the exemplary embodiment shown in the figures, the vertical portion 41 of the base 40 includes a pair of openings 44, 45 for receiving the telescopic members 20, 30. In such an embodiment, the lower end 22 of the first telescopic member 20 is secured within a first opening 44 of the base 40 and the lower end 32 of the second telescopic member 30 is secured within a second opening 45 of the base 40.

The base 40 will also generally include wheels 47, 48 so that the present invention may easily be transported when tilted back toward the user. Thus, an axle 46 will generally extend through the vertical portion 41 of the base 40 with a first wheel 47 being connected to the axle 46 at a first side of the base 40 and a second wheel 48 being connected to the axle 46 at a second side of the base 40. Wheels mounts 49 may be utilized to secure the wheels 47, 48 against the axle 46.

D. Connectors, Brackets, and Handle

As best shown in FIG. 2, the present invention utilizes connectors 50, 70 which secure the frame together. In a preferred embodiment, an upper connector 50 connects the upper ends 21, 31 of the first and second telescopic members 20, 30 in a spaced-apart relationship. In some embodiment such as that which is shown in the exemplary figures, a lower connector 70 may connect the first and telescopic members 20, 30 together at a second location at or near their respective lower ends 22, 32. It should be appreciated that more or less connectors 50, 70 may be utilized in different embodiments, with the two-connector 50, 70 configuration shown in the figures being merely for exemplary purposes and in no way limiting on the scope of the present invention.

Figure 3:
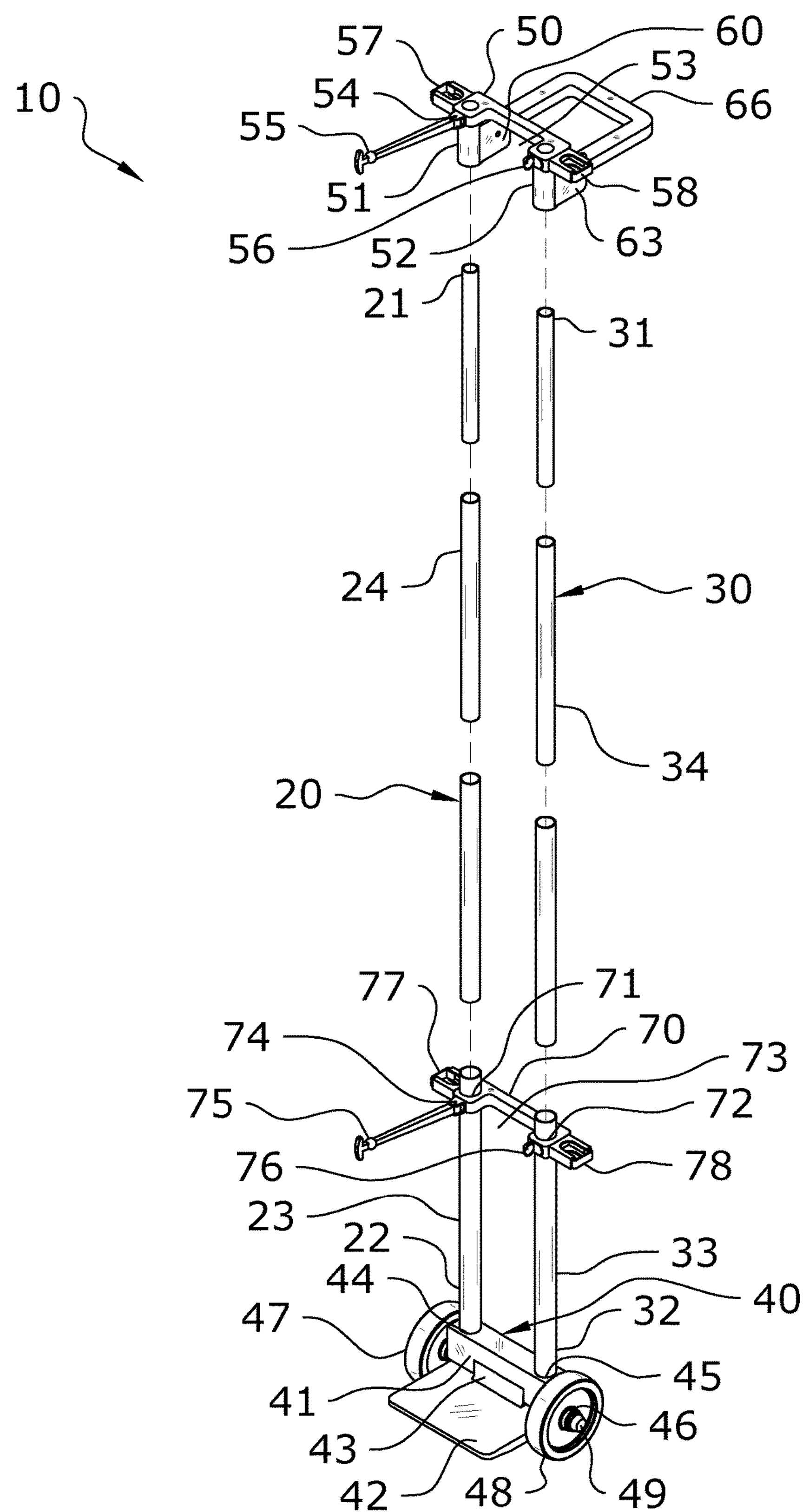
FIG. 3 is an exploded view of the present invention.

As best shown in FIG. 3, the upper connector 50 is connected to the upper ends 21, 31 of the telescopic members 20, 30 of the present invention. The upper connector 50 thus will generally include a first receiver 51 for receiving and connecting to the upper end 21 of the first telescopic member 20 and a second receiver 52 for receiving and connecting to the upper end 31 of the second telescopic member 30. The receivers 51, 52 will generally comprise receiver openings or the like which face downwardly to receive the telescopic members 20, 30 such as shown in FIGS. 2 and 3. The upper connector 50 may enclose a release mechanism which may be utilized to collapse the telescopic members 20, 30.

The upper connector 50 may comprise various configurations, shapes, and orientations. Preferably, it will bridge between the telescopic members 20, 30 and will thus comprise an elongated configuration for connecting between the two members 20, 30. Preferably, the upper connector 50 will include a recessed portion 53 so that the skis 12 are retained by outer flanges from falling to either side when secured within the present invention. An exemplary recessed portion 53, defined between two flanges, it shown in FIG. 8.

The upper connector 50 will also generally utilize a first locking assembly comprising a hinge 54, locking member 55, and lock receiver 56 to aid in locking skis 12 against the upper connector 50. The hinge 54 will generally be positioned on a first side of the upper connector 50, such as adjacent the first receiver 51, while the lock receiver 56 will generally be positioned on a second side of the upper connector 50, such as adjacent the second receiver 52. This configuration may be altered, such as by reversing the placements of the hinge 54 and lock receiver 56.

A locking member 55 comprising an elongated rod or the like will be hingedly connected at a first end to the hinge 54 so that the locking member 55 may swing over and away from the recessed portion 53 of the upper connector 50 in which the skis 12 are generally stored. The second end of the locking member 55 is removably lockable within the lock receiver 56. When transporting skis 12, the locking member 55 will be swung shut to cover the recessed portion 53 such that the locking member 55 is locked within the lock receiver 56. The locking member 55 may be released and swung away when the skis 12 are to be removed from the present invention.

The upper connector 50 will also generally include a pair of upper pole retainers 57, 58 which aid in securing ski poles 13 against the present invention. Preferably as shown in FIG. 2, a first upper pole retainer 57 will extend from a first side of the upper connector 50 and a second upper pole retainer 58 will extend from a second side of the upper connector 50. The type of upper pole retainers 57, 58 utilized may vary so long as a ski pole 13 may be easily and quickly locked or released to or from the retainers 57, 58.

As shown throughout the figures, a handle 66 may be rotatably connected to the upper connector 50. In some embodiments, the handle 66 may be removable from the upper connector 50, such as by snapping on and off the upper connector 50. The handle 66 aids with moving the present invention when in its caddy configuration. Generally, the upper connector 50 will include a first bracket 60 having a first pivot pin 61 and a second bracket 63 having a second pivot pin 64. The handle 66 is connected between the brackets 60, 63 via the pivot pins 61, 64 so that the handle 66 may pivot between a retracted position such as shown in FIG. 1 and an extended position such as shown in FIG. 2. In some embodiments, the handle 66 may be lockable into various positions.

As best shown in FIG. 3, the lower connector 70 is connected to the telescopic members 20, 30 of the present invention. The positioning of the lower connector 70 will vary. Preferably, the lower connector 70 will be connected between the fixed portions 23, 33 of the telescopic members 20, 30. The lower connector 70 will generally be positioned below the mid-point of the length of the telescopic members 20, 30. In a preferred embodiment, the lower connector 70 is connected between the upper ends of the respective fixed portions 23, 33 of the telescopic members 20, 30.

The lower connector 70 will generally include a first opening 71 through which the first telescopic member 20 extends and a second opening 72 through which the second telescopic member 30 extends. The configuration, shape, and size of the openings 71, 72 may vary in different embodiments of the present invention.

The lower connector 70 may comprise various configurations, shapes, and orientations. Preferably, it will bridge between the telescopic members 20, 30 and will thus comprise an elongated configuration for connecting between the two members 20, 30. Preferably, the lower connector 70 will include a recessed portion 73 so that the skis 12 are retained by outer flanges from falling to either side when secured within the present invention.

The lower connector 70 will also generally utilize a second locking assembly comprising a hinge 74, locking member 75, and lock receiver 76 to aid in locking skis 12 against the lower connector 70. The hinge 74 will generally be positioned on a first side of the lower connector 70, such as adjacent the first opening 71, while the lock receiver 76 will generally be positioned on a second side of the lower connector 70, such as adjacent the second opening 72. This configuration may be altered, such as by reversing the placements of the hinge 74 and lock receiver 76.

A locking member 75 comprising an elongated rod or the like will be hingedly connected at a first end to the hinge 74 so that the locking member 75 may swing over and away from the recessed portion 73 of the lower connector 70 in which the skis 12 are generally stored. The second end of the locking member 75 is removably lockable within the lock receiver 76. When transporting skis 12, the locking member 75 will be swung shut to cover the recessed portion 73 such that the locking member 75 is locked within the lock receiver 76. The locking member 75 may be released and swung away when the skis 12 are to be removed from the present invention.

The lower connector 70 will also generally include a pair of lower pole retainers 77, 78 which aid in securing ski poles 13 against the present invention. Preferably as shown in FIG. 2, a first lower pole retainer 77 will extend from a first side of the lower connector 70 and a second lower pole retainer 78 will extend from a second side of the lower connector 70. The type of lower pole retainers 77, 78 utilized may vary so long as a ski pole 13 may be easily and quickly locked or released to or from the retainers 77, 78.

E. Operation of Preferred Embodiment

The present invention is interchangeable between two distinct configurations: a collapsed configuration to ease transport of the present invention itself and a caddy configuration to ease transport of skis 12 and poles 13 within the present invention. The collapsed configuration is best shown in FIG. 1 and the caddy configuration is best shown in FIG. 2.

In the collapsed configuration, the telescopic members 20, 30 are fully retracted by nesting the telescopic portions 23, 33 into the fixed portions 24, 34 of the respective telescopic members 20, 30. The horizontal portion 42 of the base 40 is rotated upwardly to rest against the vertical portion 41 of the base 40. The handle 66 is similarly rotated downwardly into a resting position. The locking members 55, 75 are also locked against their respective lock receivers 56, 76. Thus, the present invention may be collapsed into an easily-transportable configuration as shown in FIG. 1. This configuration could, for example, easily fit within a vehicle's cargo space or within a backpack.

In the caddy configuration, the present invention may be utilized to easily store and transport skis 12 and poles 13. In such a configuration, which is shown throughout the figures, the telescopic members 20, 30 are fully extended by pulling the telescopic portions 23, 33 out of the fixed portions 24, 34. The horizontal portion 42 of the base 40 is rotated downwardly to extend horizontally and act as a resting point for the lower ends of the skis 12.

To secure skis 12 within the present invention, the locking members 55, 75 are swung away from the lock receivers 56 to expose the recessed portions 53, 73 of the connectors 50, 70. The skis 12 may then be placed between the telescopic members 20, 30 such that they rest within the recessed portions 53, 73 of the connectors 50, 70. With the skis 12 so positioned, the locking members 55, 75 may be swung over the recessed portions 53, 73 to lock against the lock receivers 56 and thus secure the skis 12 within the present invention such as shown in FIG. 4.

Figure 4:
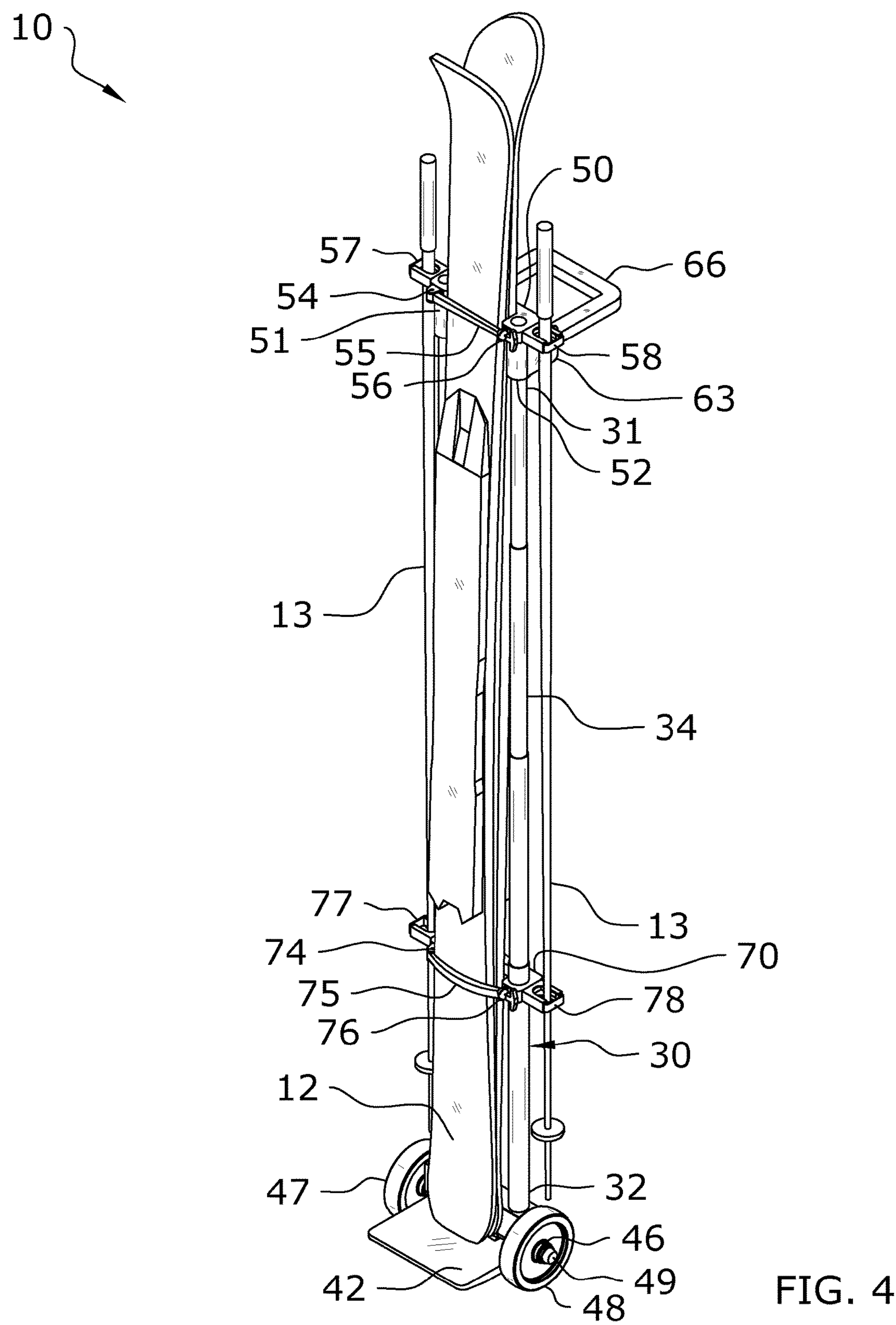
FIG. 4 is an upper perspective view of the present invention in use for transporting skis and poles.
Figure 5:
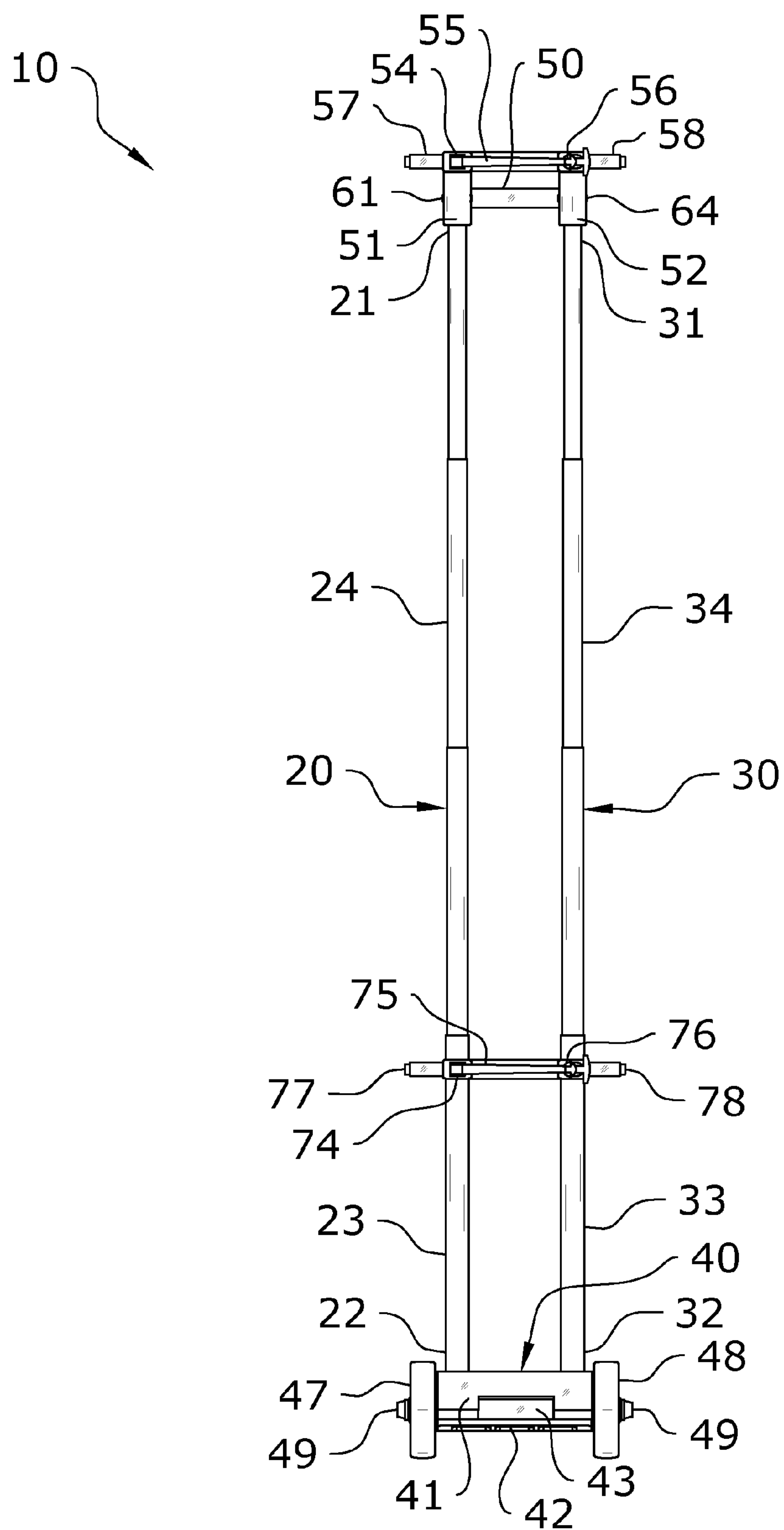
FIG. 5 is a rear view of the present invention in a transport configuration.
Figure 6:
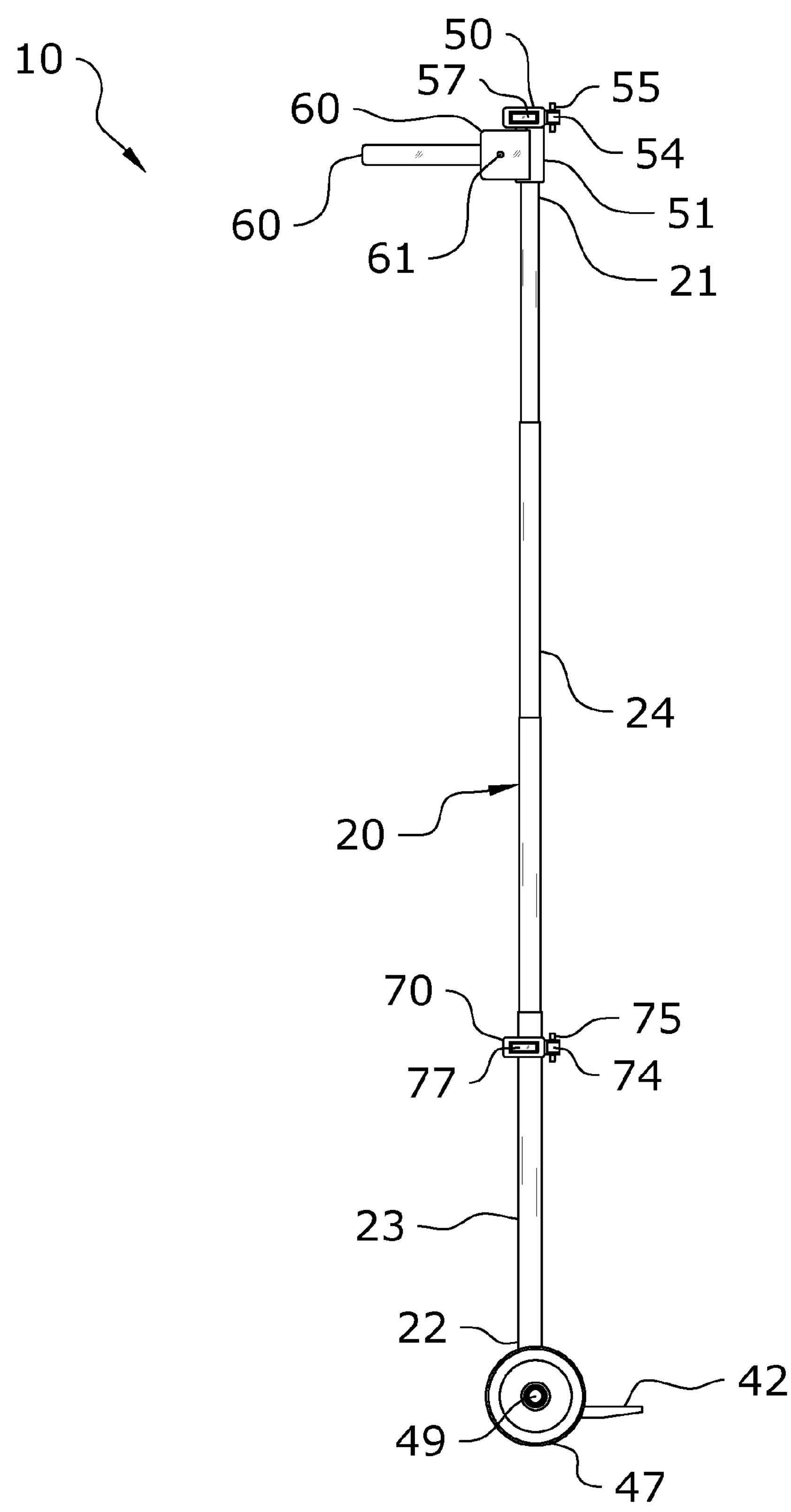
FIG. 6 is a first side view of the present invention in a transport configuration.
Figure 7:
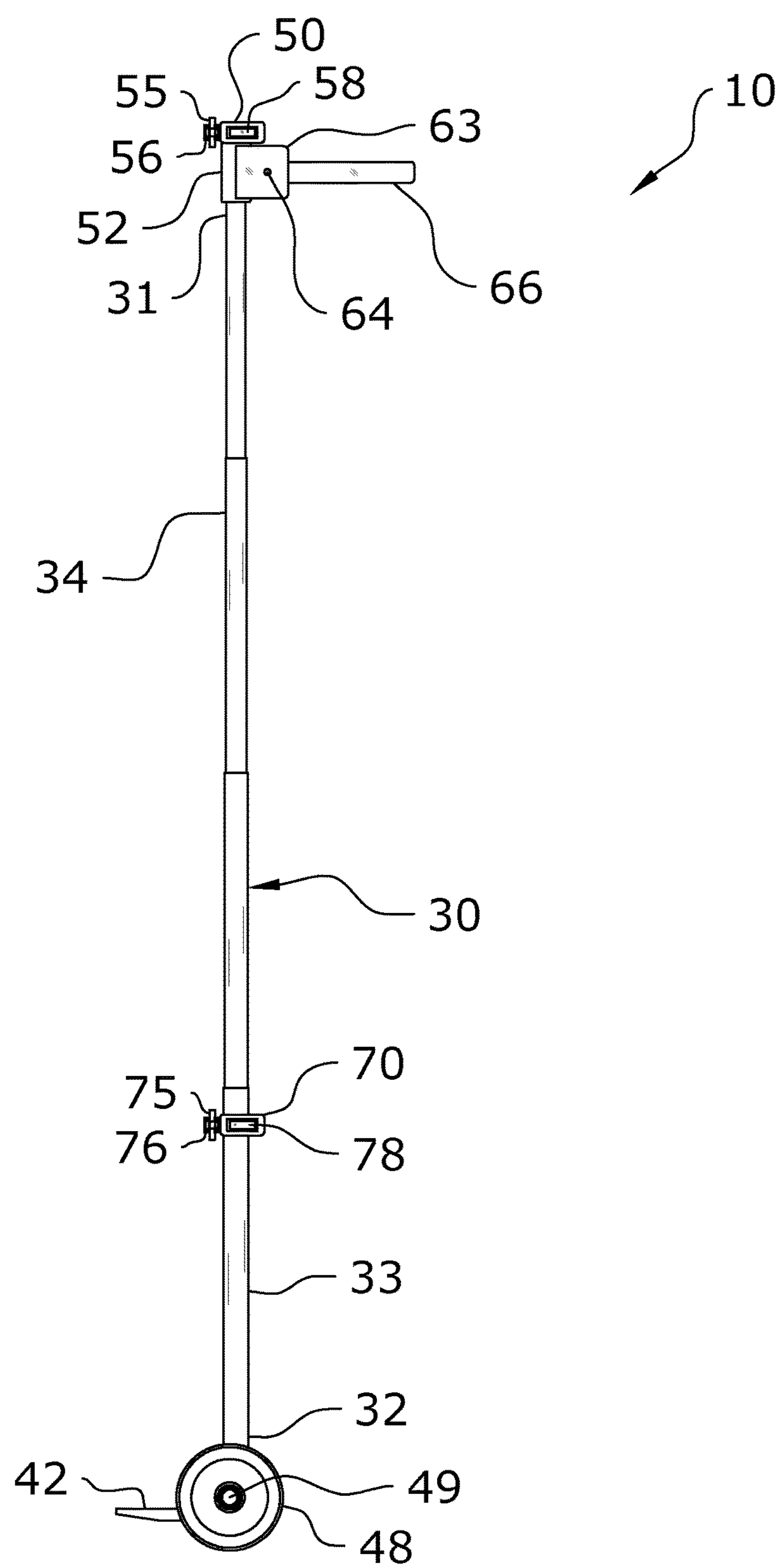
FIG. 7 is a second side view of the present invention in a transport configuration.
Figure 8:
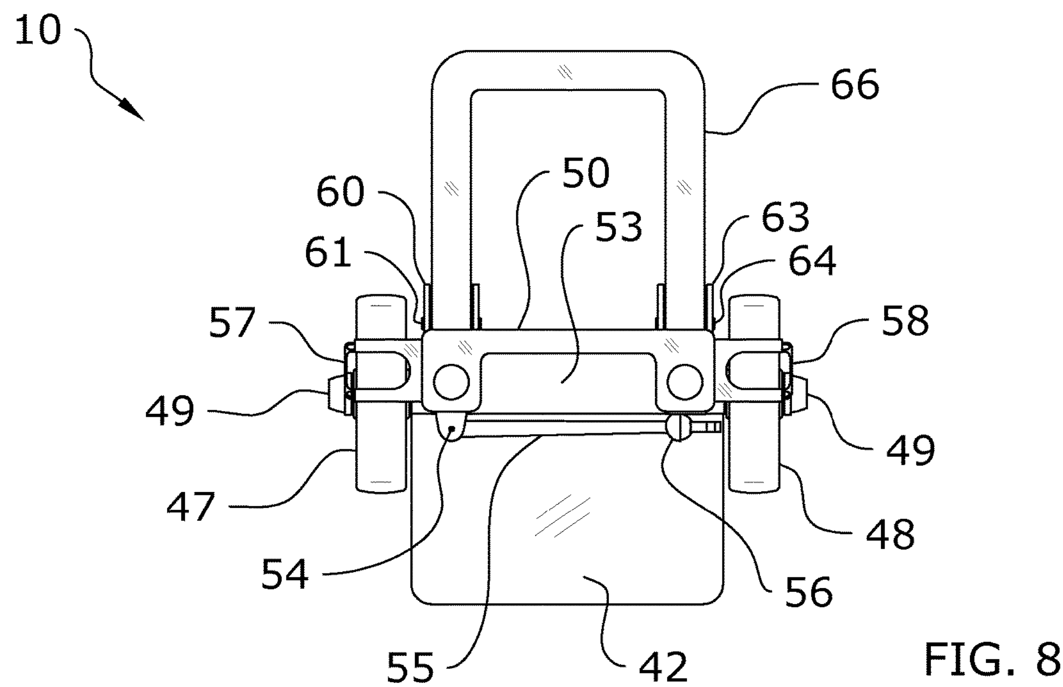
FIG. 8 is a top view of the present invention.
Figure 9:
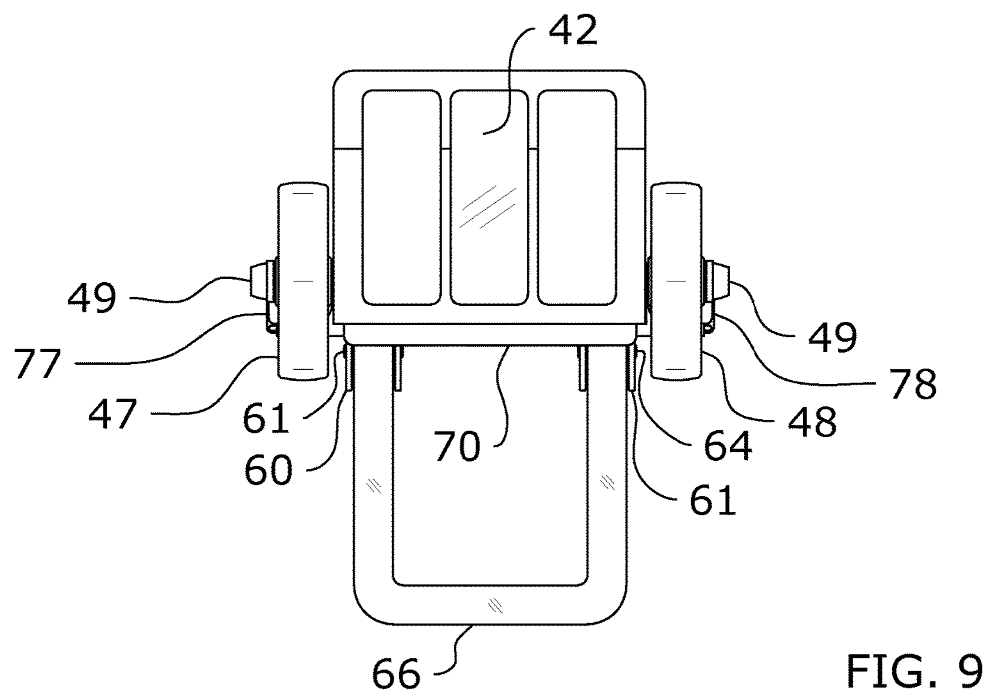
FIG. 9 is a bottom view of the present invention.

With the skis 12 so secured, the poles 13 may similarly be secured to the present invention by use of the pole retainers 57, 58, 77, 78 as shown in FIG. 4. A first pole 13 may be connected between the first upper and lower pole retainers 57, 77 and a second pole 13 may be connected between the second upper and lower pole retainers 58, 78. The handle 66 may also be swung downwardly for use. By grasping the handle 66 and tilting the present invention toward the user, the wheels 47, 48 may be utilized to easily transport the present invention and secured skis 12 and poles 13. When completed, the present invention may be retracted into its transport configuration to be moved for further use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A collapsible ski caddy, comprising:

a first telescopic member having an upper end and a lower end;

a second telescopic member having an upper end and a lower end, wherein said first telescopic member is parallel with said second telescopic member;

a base, wherein said lower end of said first telescopic member is connected to said base, wherein said lower end of said second telescopic member is connected to said base;

an upper connector, wherein said upper end of said first telescopic member is connected to said upper connector, wherein said upper end of said second telescopic member is connected to said upper connector, wherein said upper connector includes a first recessed portion for receiving one or more skis, wherein said first locking member rotates over said first recessed portion; and a first locking member rotatably connected to said upper connector.

2. The collapsible ski caddy of claim 1, wherein said base includes a vertical portion and a horizontal portion hingedly connected to said vertical portion.

3. The collapsible ski caddy of claim 2, wherein said base includes a first wheel and a second wheel.

4. The collapsible ski caddy of claim 1, wherein said base includes a first opening for receiving said lower end of said first telescopic member and a second opening for receiving said lower end of said second telescopic member.

5. The collapsible ski caddy of claim 1, further comprising a handle rotatably connected between said first telescopic member and said second telescopic member.

6. The collapsible ski caddy of claim 1, wherein said upper connector includes a first bracket and a second bracket, wherein said handle is connected to said first bracket and said second bracket.

7. The collapsible ski caddy of claim 1, wherein said upper connector includes a first receiver for receiving said upper end of said first telescopic member and a second receiver for receiving said upper end of said second telescopic member.

8. The collapsible ski caddy of claim 1, wherein said upper connector includes a first lock receiver for removably locking said first locking member over said first recessed portion.

9. The collapsible ski caddy of claim 1, further comprising a lower connector, wherein said lower connector is connected between said first telescopic member and said second telescopic member.

10. The collapsible ski caddy of claim 9, wherein said lower connector is positioned near said lower ends of said first and second telescopic members.

11. The collapsible ski caddy of claim 9, wherein said lower connector includes a first opening for receiving said first telescopic member and a second opening for receiving said second telescopic member.

12. The collapsible ski caddy of claim 9, wherein said lower connector includes a second recessed portion for receiving one or more skis.

13. The collapsible ski caddy of claim 12, further comprising a second locking member rotatably connected to said lower connector.

14. The collapsible ski caddy of claim 13, wherein said second locking member rotates over said second recessed portion.

15. The collapsible ski caddy of claim 9, wherein said lower connector includes a first lower pole retainer and a second lower pole retainer.

16. The collapsible ski caddy of claim 15, wherein said upper connector includes a first upper pole retainer and a second upper pole retainer.

17. A collapsible ski caddy, comprising:

a first telescopic member having an upper end and a lower end, wherein said first telescopic member includes a fixed portion and a telescopic portion;

a second telescopic member having an upper end and a lower end, wherein said first telescopic member is parallel with said second telescopic member, wherein said second telescopic member includes a fixed portion and a telescopic portion;

a base, wherein said lower end of said first telescopic member is connected to said base, wherein said lower end of said second telescopic member is connected to said base;

an upper connector, wherein said upper end of said first telescopic member is connected to said upper connector, wherein said upper end of said second telescopic member is connected to said upper connector, wherein said upper connector includes a first recessed portion;

a lower connector, wherein said fixed portion of said first telescopic member extends through a first opening of said lower connector and wherein said fixed portion of said second telescopic member extends through a second opening of said lower connector, wherein said lower connector includes a second recessed portion;

a first locking member rotatably connected to said upper connector, wherein said first locking member rotates over said first recessed portion; and a second locking member rotatably connected to said lower connector, wherein said second locking member rotates over said second recessed portion.

18. The collapsible ski caddy of claim 17, wherein said upper connector includes a first upper pole retainer and a second upper pole retainer, wherein said lower connector includes a first lower pole retainer and a second lower pole retainer.

* * * * *